(12) United States Patent
Eijkelenberg et al.

(10) Patent No.: US 8,714,514 B2
(45) Date of Patent: May 6, 2014

(54) PINCH VALVE HAVING INTEGRATED PRESSURE CHAMBER

(75) Inventors: Tom Eijkelenberg, Westerlo (BE); Guy Jakus, Zemst (BE); Jef Snoeys, Rijkevorsel (BE)

(73) Assignee: Fike Corporation, Blue Springs, MO (US)

( * ) Notice: Subject to any disclaimer, the term of this patent is extended or adjusted under 35 U.S.C. 154(b) by 68 days.

(21) Appl. No.: 13/416,675

(22) Filed: Mar. 9, 2012

(65) Prior Publication Data

US 2013/0234054 A1    Sep. 12, 2013

(51) Int. Cl.
*F16K 7/04* (2006.01)
*B65D 90/66* (2006.01)

(52) U.S. Cl.
USPC .................. 251/5; 251/29; 251/30.05

(58) Field of Classification Search
USPC ............... 251/5, 28, 29, 30.01, 30.02, 30.04, 251/30.05
See application file for complete search history.

(56) References Cited

U.S. PATENT DOCUMENTS

| | | | |
|---|---|---|---|
| 3,145,967 A * | 8/1964 | Gardner | 251/5 |
| 3,586,458 A | 6/1971 | Avery et al. | |
| 3,719,214 A | 3/1973 | Erndt | |
| 4,083,187 A | 4/1978 | Nagashima | |
| 4,125,125 A * | 11/1978 | Ezekoye et al. | 137/315.07 |
| 4,135,550 A * | 1/1979 | Andersson | 137/565.14 |
| 4,454,983 A * | 6/1984 | Tarvis, Jr. | 236/93 A |
| 4,548,382 A | 10/1985 | Otting | |
| 5,035,350 A | 7/1991 | Blette et al. | |
| 5,107,883 A | 4/1992 | Shaw | |
| 5,131,423 A | 7/1992 | Shaw | |
| 5,188,134 A * | 2/1993 | Satoh et al. | 134/57 R |
| 5,305,983 A * | 4/1994 | Haase et al. | 251/5 |
| 5,771,665 A | 6/1998 | Nelson et al. | |
| 6,102,361 A * | 8/2000 | Riikonen | 251/5 |
| 6,399,912 B1 | 6/2002 | Steenis et al. | |
| 6,572,259 B2 * | 6/2003 | Burnett et al. | 366/191 |
| 7,241,080 B2 | 7/2007 | Klobucar et al. | |
| 7,516,909 B2 | 4/2009 | Kaligian, II et al. | |
| 7,628,295 B2 * | 12/2009 | Mondloch et al. | 222/397 |
| 2003/0085369 A1 | 5/2003 | Ellis | |
| 2008/0105839 A1 | 5/2008 | Jennings et al. | |

FOREIGN PATENT DOCUMENTS

GB            793231        4/1958

OTHER PUBLICATIONS

The European Search Report and Search Opinion dated Jun. 24, 2013 in the corresponding European Patent Application No. 13001222.2. filed on Mar. 11, 2013.

* cited by examiner

*Primary Examiner* — Elizabeth Houston
*Assistant Examiner* — Daphne M Barry
(74) *Attorney, Agent, or Firm* — Hovey Williams LLP

(57) ABSTRACT

A pinch-type isolation valve (10) is provided having an integrated, on-board reservoir (42) for storing a pressurized fluid capable of effecting the collapse of an internal sleeve (32) upon actuation of the valve. Valve (10) comprises an outer wall 16 and an inner wall (30) which define the pressurized gas reservoir (42). An actuator assembly (14) is provided to cause and direct a flow of pressurized gas from the reservoir (42) into a gas-receiving chamber (39) defined between the inner wall (30) and sleeve (32).

20 Claims, 7 Drawing Sheets

PINCH VALVE HAVING INTEGRATED PRESSURE CHAMBER

BACKGROUND OF THE INVENTION

1. Field of the Invention

The present invention is generally directed toward a pinch-type isolation valve comprising an integrated pressurized gas reservoir. The pressurized gas reservoir stores sufficient pressurized gas on board the valve to effect the collapse of an internal sleeve carried by the valve, which closes the valve.

2. Description of the Prior Art

Isolation valves, including pinch-type valves, have been used to control the flow of fluid or particulate material, such as grain, through a conduit, and also to prevent propagation of hazardous conditions, such as fires and explosions, through interconnecting pipes or conveying lines to additional process equipment or operating locations. As many hazardous conditions tend to propagate very quickly, rapid closure of valves is important to the successful isolation of vulnerable process equipment. A number of pinch valve designs have been proposed for various applications.

U.S. Pat. No. 7,246,786 to Schmidt et al. is directed toward a mechanical pinch-type isolation valve for controlling fluid flow in industrial applications. This mechanical valve includes a pair of rotating pinch elements that impinge a rubber spool so as block the flow of material therethrough.

U.S. Pat. No. 5,107,883 to Shaw is directed toward a slow, variable-response pinch valve control system having a network of pinch valves (e.g. for waterlines in a building to reduce/prevent water hammer). Each pinch valve includes a single solenoid operable to rotatably pivot between a first orientation, where compressed gas is directed from a first passageway connected to a source to an inner chamber defined by a sleeve and outer wall of the waterline, and a second orientation, where compressed gas is exhausted from the chamber through a second passageway.

U.S. Pat. No. 5,771,665 to Nelson et al. is directed toward a sand-bagging system and includes a pinch valve that comprises a chamber with laterally-aligned apertures on the sidewall thereof that provide fluid communication between the chamber and a flexible tubular wall and air lines connected to the apertures. A three-way pilot valve permits introduction or evacuation of air via through the lines to compress or expand the wall.

Conventional pinch valves rely upon external resources for providing the motive force, typically compressed air or other fluid, for operation of the valve. If those resources became unavailable, due to plant power failure or damage as a result of a hazardous conditions, the valve would not be operable.

SUMMARY OF THE INVENTION

Embodiments according to the present invention seek to mitigate reliance upon external power and compressed air resources for valve operation thus preserving the valve's operational readiness even under extreme circumstances. Further, valve response time is enhanced by being able to rapidly deliver a pressurized gas to impinge upon the valve's flexible sleeve and close the valve.

In one embodiment according to the present invention there is provided an isolation valve comprising a valve body outer wall and a valve body inner wall. The outer and inner walls cooperate to define at least in part a pressurized gas reservoir. A flexible sleeve is disposed within the inner wall. The sleeve and inner wall cooperate to define, at least in part, a gas-receiving chamber. The valve further includes at least one actuator assembly configured upon actuation to cause a gas stored in the reservoir to flow into the chamber and effect closure of the valve.

In another embodiment according to the present invention there is provided an isolation valve comprising a tubular outer wall, a tubular inner wall disposed at least in part within the tubular outer wall, and a flexible sleeve disposed at least in part within the inner wall. The flexible sleeve is shiftable between a valve open configuration and a valve closed configuration. The inner and outer walls cooperate to define, at least in part, a pressurized gas reservoir. The inner wall and flexible sleeve cooperate to define, at least in part, a gas-receiving chamber. The pressurized gas reservoir and gas-receiving chamber are interconnected by at least one passageway. At least one actuator assembly is provided and configured to block communication between the pressurized gas reservoir and the gas-receiving chamber through the passageway while the valve is in said valve open configuration. The at least one actuator assembly is shiftable upon actuation to unblock the passageway thereby permitting flow of pressurized gas from the reservoir to the chamber and causing the valve to shift to the valve closed configuration.

DETAILED DESCRIPTION OF THE PREFERRED EMBODIMENT

Figure 1:
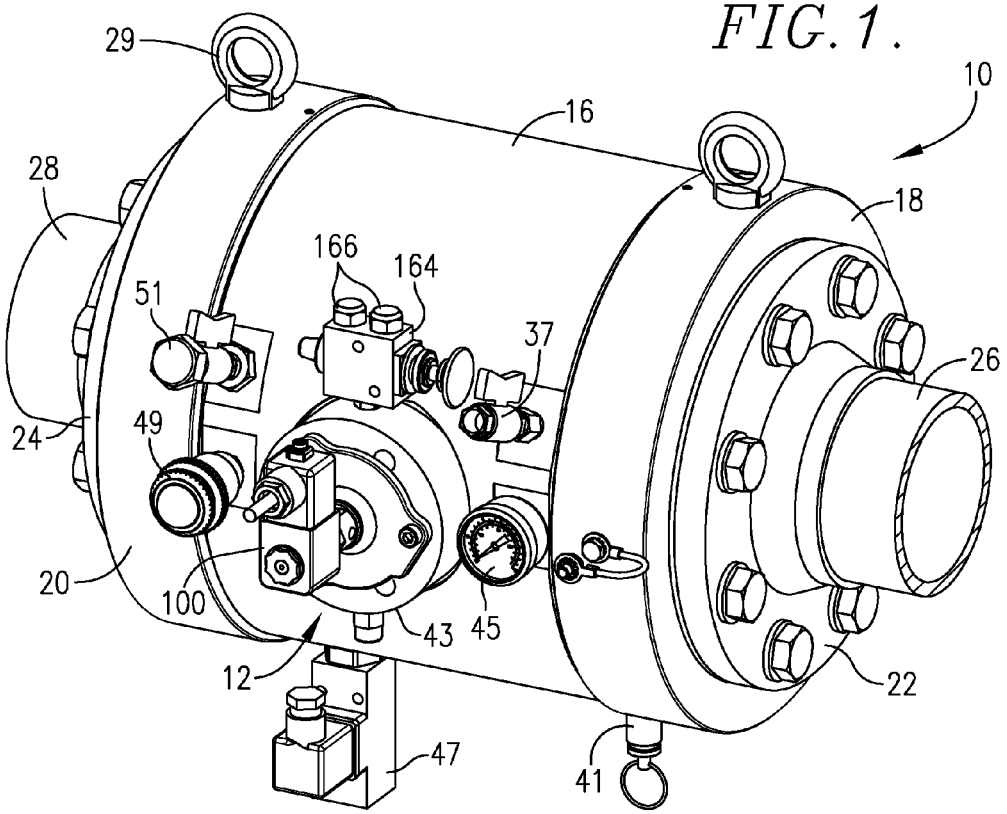
FIG. 1 is a perspective view of an isolation valve in accordance with one embodiment of the present invention.
Figure 2:
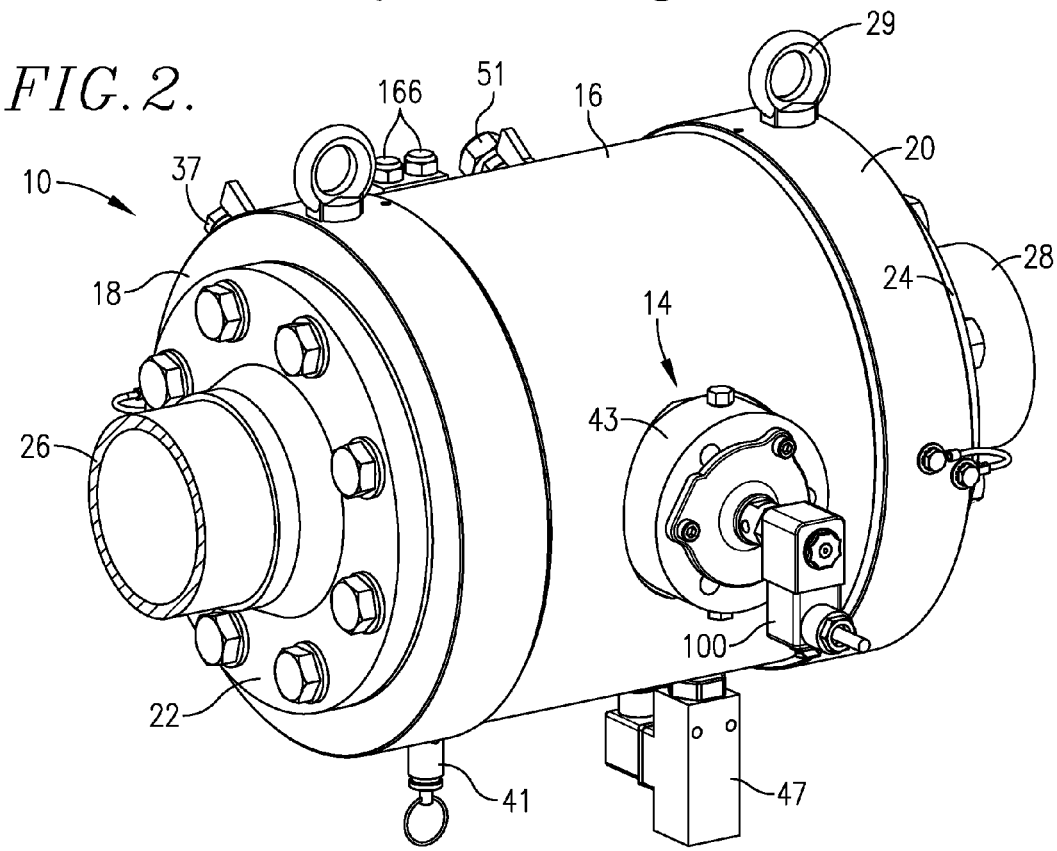
FIG. 2 is an alternate perspective view of the isolation valve of FIG. 1.

Turning now to FIGS. 1 and 2, a pinch valve 10 made in accordance with one embodiment of the present invention is illustrated. Valve 10 comprises a pair of actuator assemblies 12, 14 (see, FIG. 2) secured to a valve body outer wall 16. The construction and operation of actuator assemblies 12, 14 is explained in greater detail below. As shown in the Figures, outer wall 16 is substantially cylindrical, although, it is sufficient for the outer wall to be merely tubular in form. A pair of end caps 18, 20 are attached to respective ends of outer wall 16 and provide points for coupling flanges 22, 24 and their associated pipe sections 26, 28. End caps 18, 20 may also be equipped with eye bolts 29 to assist with mounting of valve 10 within a plant.

Figure 3:
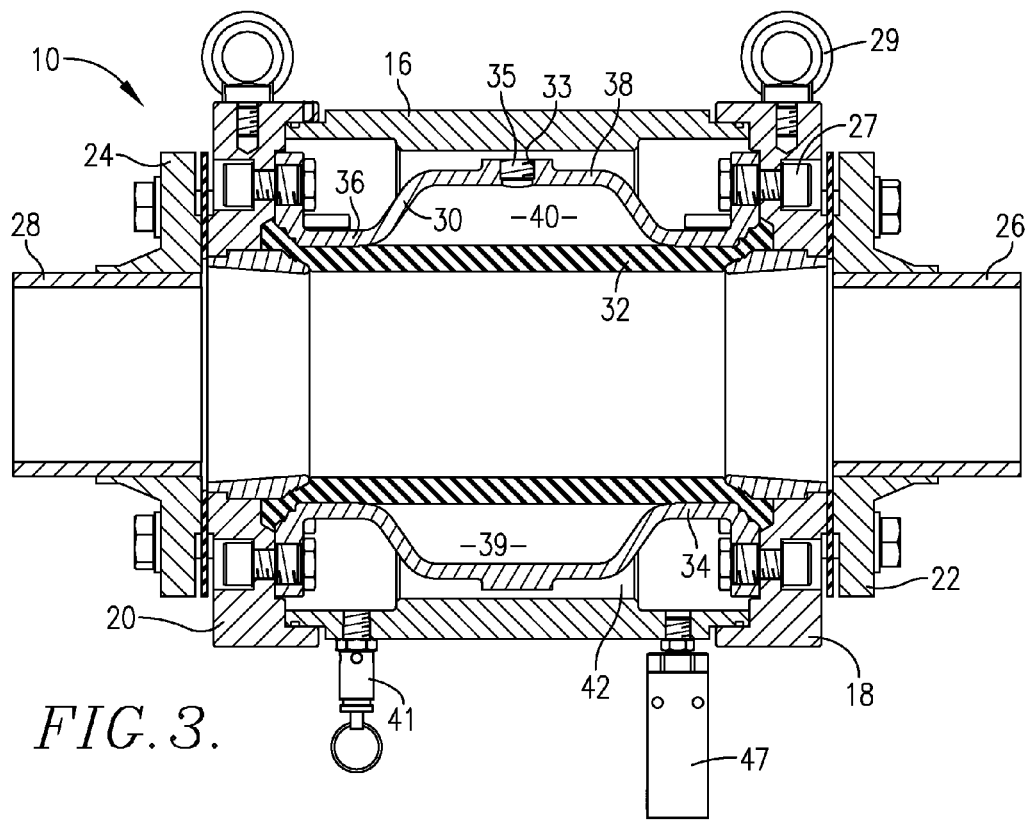
FIG. 3 is a cross-sectional view of the isolation valve taken along the longitudinal axis of the valve.
Figure 4:
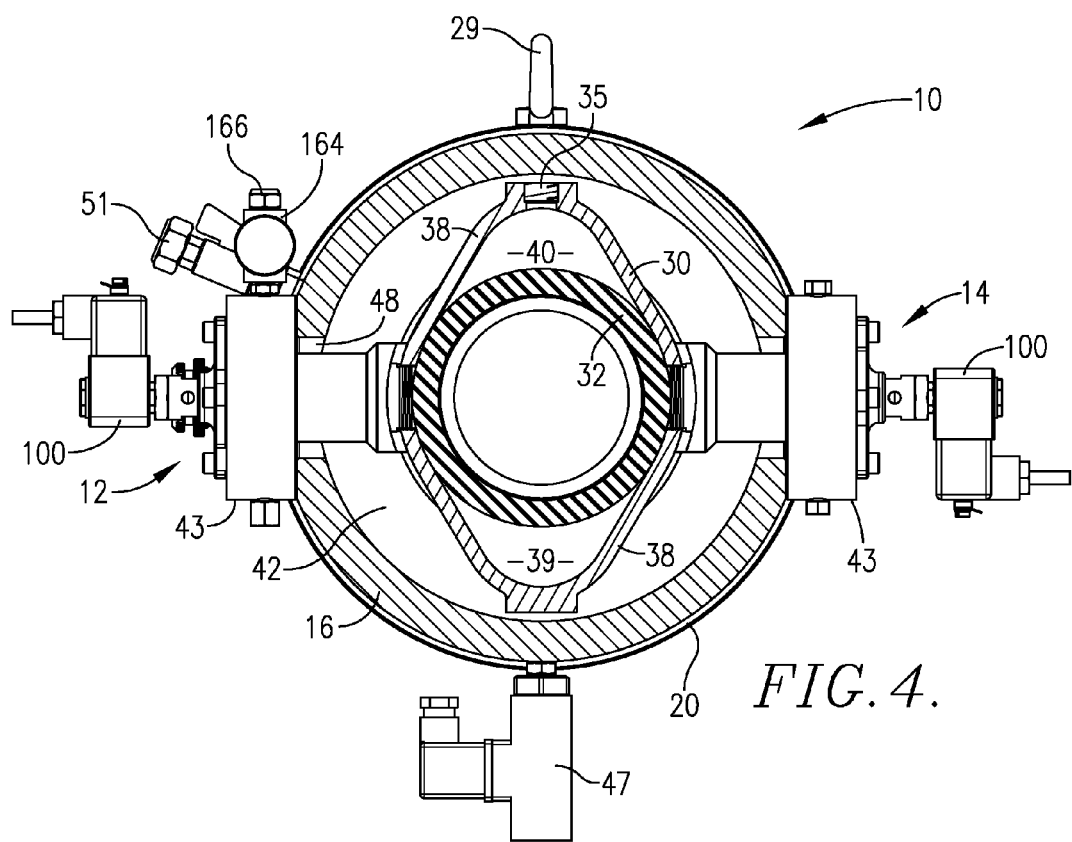
FIG. 4 is a cross-sectional view of the isolation valve taken perpendicular to the longitudinal axis of the valve.

As shown in FIG. 3, a valve body inner wall 30 is located inside and is generally coaxial with outer wall 16. A flexible sleeve 32, made from an elastomeric material, is located within inner wall 30 and defines a gas-receiving chamber 39. As best seen in FIG. 4, inner wall 30 is tubular and irregularly shaped as compared with outer wall 16. Inner wall 30 comprises a pair of generally cylindrical end sections 34, 36 that are secured to end caps 18, 20, respectively, by bolt assemblies 27. End sections 34, 36 are interconnected by a central segment 38 that bulges toward outer wall 16. Bulged segment 38 defines a relief zone 40 that provides an area capable of accommodating a collapsed sleeve 32 upon actuation of valve 10 (see, FIG. 8). As illustrated, bulged segment 38 includes a port 33 that communicates with relief zone 40 and is normally sealed with a plug 35. Flexible sleeve 32 defines, at least in part, a passageway through valve 10 that communicates with pipe sections 26, 28.

Outer wall 16, inner wall 30 and end caps 18, 20 cooperate to define a reservoir 42 that is configured to hold a pressurized gas. As explained below, the pressurized gas stored in reservoir 42 is available for use as the motive force for effecting collapse of sleeve 32 and closing of valve 10. Reservoir 42 is capable of holding a supply of a pressurized gas, such as compressed air, nitrogen, or other gaseous material. The gas is supplied to reservoir 42 through a supply valve 37 installed in outer wall 16. Multiple supply ball valves 37 can be installed to permit serial supply of gas between multiple valves 10, or to provide supply of pressurized gas from redundant supply sources. As shown, one of ball valves 37 is fitted with an exhaust filter 51 should that particular ball valve be used to vent the pressurized gas contained in reservoir 42 to the surrounding environment. A drain valve 41 may also be installed in outer wall 16 to permit manual or automatic release of the pressurized gas contained within reservoir 42 should it be necessary to service valve 10 or prevent the build up of an unsafe pressure situation within reservoir 42. Other safety and monitoring equipment may also be installed on valve 10 as desired, including a pressure gauge 45, pressure switch 47, and a colored pressure indicator 49.

Reservoir 42 communicates with the gas-receiving chamber 39 through a passageway that is controlled by actuator assemblies 12, 14. Note, the embodiment of valve 10 illustrated in the Figures comprises a plurality of substantially identical actuator assemblies; however, it is within the scope of the present invention for valve 10 to comprise only a single actuator assembly, or actuator assemblies of alternate configurations.

Figure 6:
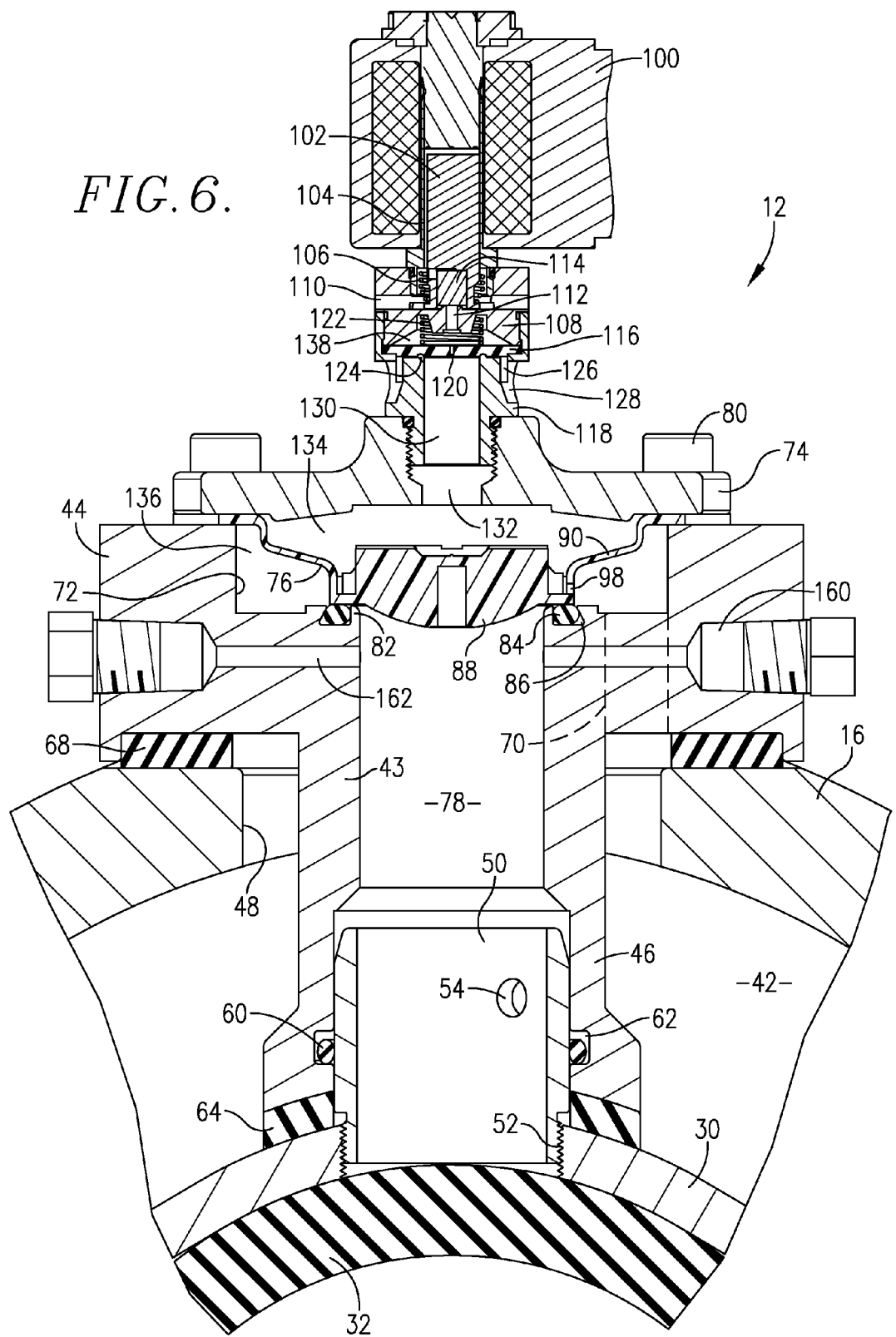
FIG. 6 is a closeup cross-sectional view of an actuator assembly in blocking relationship to the passageway interconnecting the pressurized gas reservoir with the gas-receiving chamber.
Figure 7:
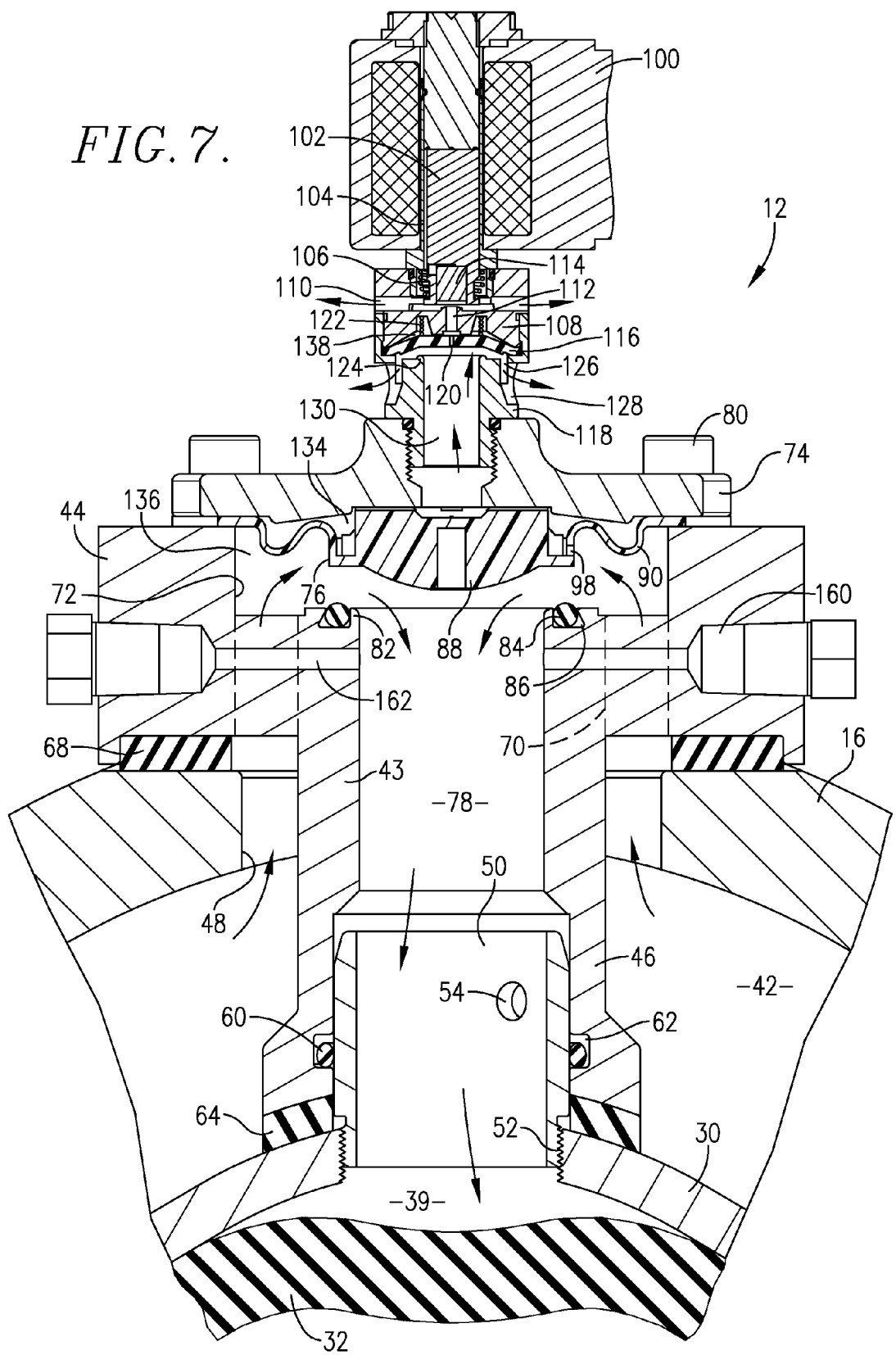
FIG. 7 is a closeup cross-sectional view of the actuator assembly illustrating displacement of the seal upon actuation of the actuator assembly thereby opening the passageway interconnecting the pressurized gas reservoir with the gas-receiving chamber to effect closing of the valve.

Turning to FIGS. 6 and 7, the structural elements and operation of actuator assembly 12 are illustrated. Actuator assembly 12 comprises an actuator body 43 having an upper body section 44 and a lower body section 46. Lower body section 46 is received through an opening 48 in valve body outer wall 16. A nipple 50 is received into lower body section 46 and is secured at its distal end to valve body inner wall 30 via a threaded connection 52. Nipple 50 includes an orifice 54 through which a tool may be inserted so as to assist with coupling of nipple 50 to inner wall 30. The proximal end of nipple 50 is tapered to assist with insertion into lower body section 46. An O-ring 60 is provided in a circumscribing channel 62 formed in lower body section 46 to provide a seal between nipple 50 and lower body section 46.

Figure 5:
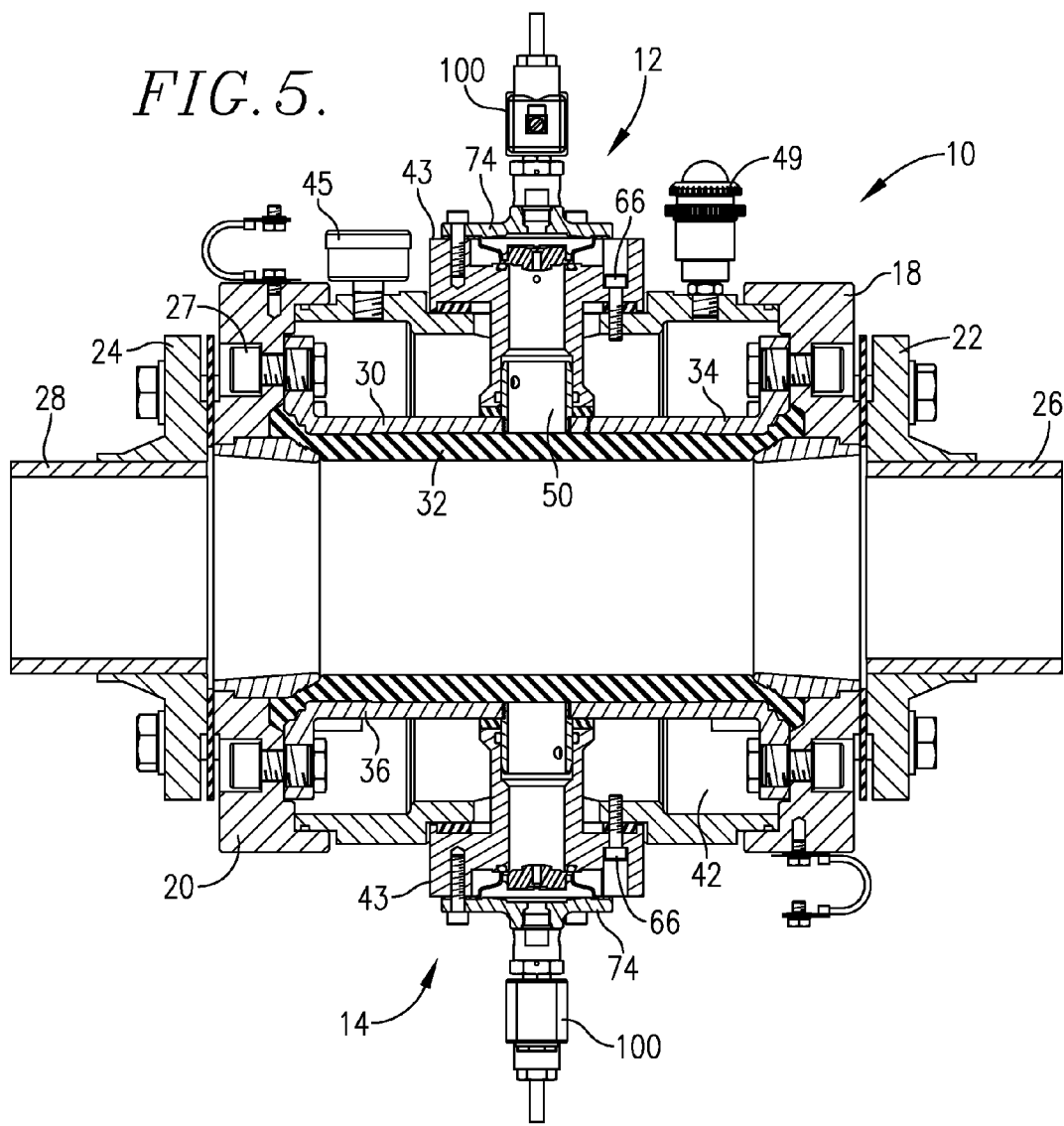
FIG. 5 is a cross-sectional view of the isolation valve taken along the longitudinal axis thereof with both actuator assemblies also shown in cross-section.

Lower body section 46 and nipple 50 define a conduit segment extending between valve body outer wall 16 and inner wall 30 that provides a pathway for fluid communication between pressurized gas reservoir 42 and gas-receiving chamber 39. A gasket 64 is installed between the distal end of lower body section 46 and valve body inner wall 30. As shown in FIG. 5, actuator body 43 is secured to valve body outer wall 16 by a plurality of bolts 66. Tightening of bolts 66 helps to seat lower body section 46 on gasket 64 and upper body section 44 on another gasket 68.

Figure 10:
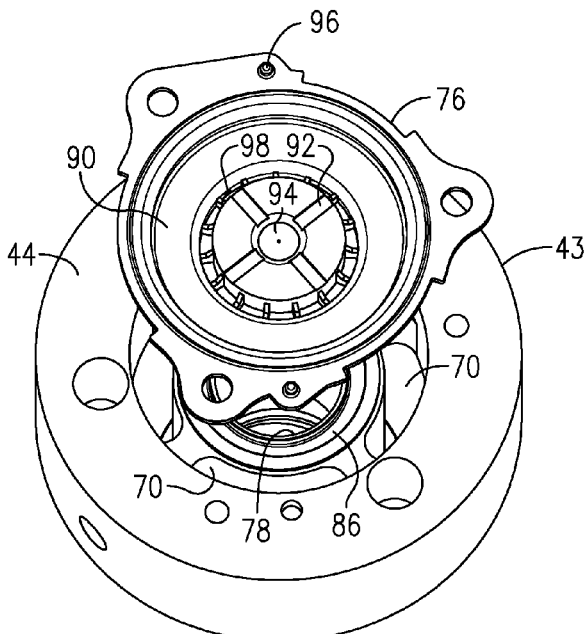
FIG. 10 is an expanded view of the lower portion of an actuator assembly.

A plurality of passages 70 (see, e.g., FIG. 10) are formed in actuator upper body section 44 and fluidly couple reservoir 42 with an actuator chamber 72 defined by upper body section 44 and an actuator connector plate 74. A displaceable seal 76 is located within chamber 72 and normally blocks communication between passages 70 and a bore 78 formed in lower body section 48. Seal 76 is secured within chamber by a plurality of bolts 80 that also couple connector plate with upper body section 44. Upper body section 44 comprises a central projection 82, that as shown also includes an O-ring 84 provided in a channel 86, that functions as a seat for seal 76.

Figure 11:
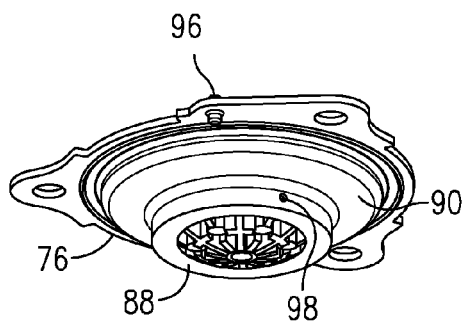
FIG. 11 is a view of one side of the actuator assembly seal.
Figure 12:
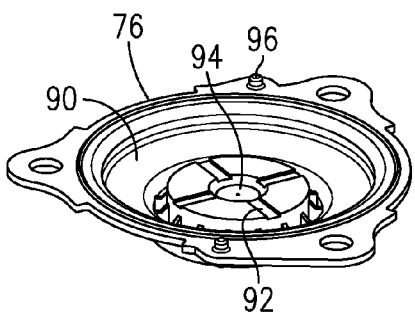
FIG. 12 is a view of another side of the actuator assembly seal.

As shown in FIGS. 11 and 12, seal 76 comprises a thicker central section 88 and a thinner outer section 90. The portion of central section 88 that is disposed in facing relationship to connector plate 74 is configured with a plurality of channels 92 that converge upon central recess 94. Outer section 90 includes one or more tabs 96 that assist with proper alignment of seal 76 when assembling actuator assembly 12. At least one through opening 98 is formed in outer section 90 that permits communication of pressurized gas stored in reservoir 42 with the portion of seal 76 in facing relationship to connector plate 74 (i.e., not in direct facing relationship with the yet-to-be-described pathway fluidly interconnecting reservoir 42 with bore 78). As explained below, the transmission of pressurized gas through opening 98 permits the pressurized gas in reservoir 42 to maintain seal 76 seated against projection 82 and in blocking relationship to bore 78.

When reservoir 42 is charged with pressurized gas, the pressurized gas exerts a force on the portion of seal outer section 90 that is in facing relationship to upper body section 44 (i.e., in direct facing relationship with the yet-to-be-described pathway interconnecting reservoir 42 with bore 78). This force is less than the force acting upon the portion of seal outer section 90 that is in facing relationship to connector plate 74 thereby keeping seal 76 seated against projection 82 and in blocking relationship to the flow of pressurized gas from reservoir 42 into bore 78.

Figure 9:
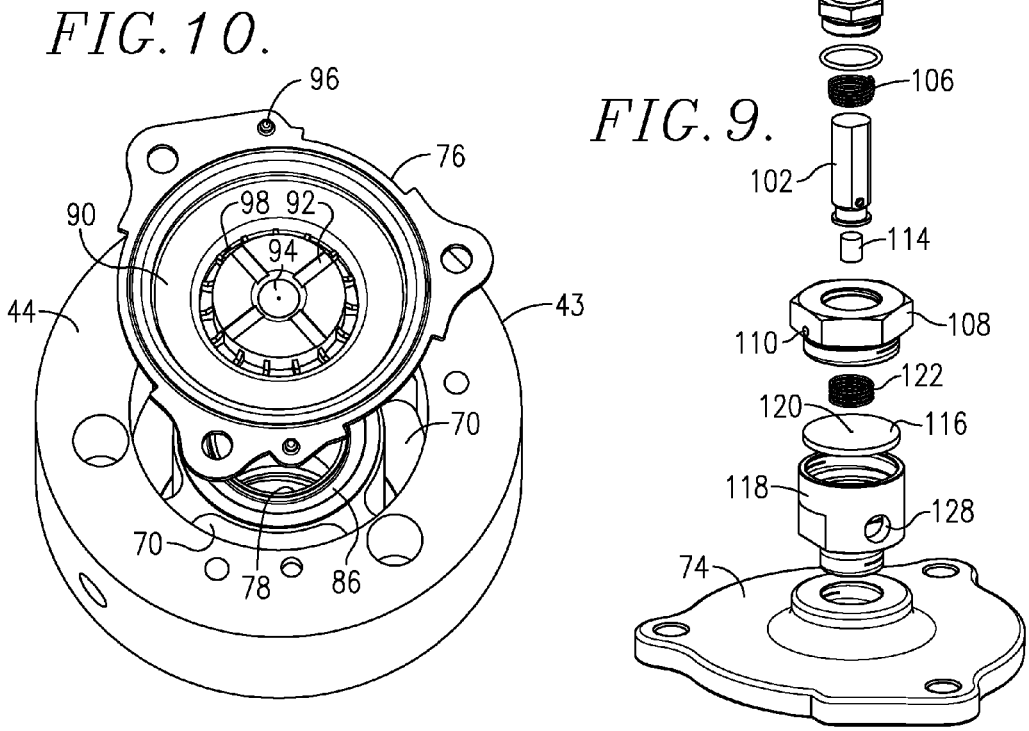
FIG. 9 is an expanded view of the upper portion of an actuator assembly.

In one embodiment of the present invention, and as depicted in FIG. 9, actuator assembly 12 comprises a solenoid actuator 100. In its normal, non-actuated configuration, a shiftable plug 102, received within a sleeve 104 is biased by a spring 106 toward a seat 108 coupled with actuator 100. Seat 108 includes a passage 110 formed therein that communicates the internal bore 112 of seat 108 with the exterior thereof. In the non-actuated configuration, plug 102, which includes an insert 114 made of a resilient material, blocks passage 110 so that pressurized gas within the actuator assembly cannot escape. Particularly, insert 114 seals off internal bore 112, so as to prevent communication thereof with passage 110. A flexible membrane 116 is installed between seat 108 and a coupler 118. Membrane 116 includes a central pinhole orifice 120 that permits communication of pressurized gas with bore 108. A spring 122 is disposed between seat 108 and membrane 116 and is configured to bias membrane 116 to a seated position against a circular rib 124 formed in coupler 118. Thus, in the non-actuated configuration, membrane 116 seals off an annular recess 126 formed in coupler 118. Recess 126 communicates with the exterior of coupler 118 by a side port 128. Coupler 118 also contains a central bore 130 that is in registry with bore 132 formed in connector plate 74.

The pressurized gas stored in reservoir 42 assists in maintaining seal 76 in a blocking relationship with bore 78, and thus the valve 10 in an open position until closing of the valve is desired and initiated by actuator assemblies 12, 14. Particularly, reservoir 42 communicates with chamber 72 via passages 70. The portion of chamber 72 defined in part by the surface of seal outer section 90 that faces passages 70 communicates with the portion of chamber 72 defined in part by the surface of seal outer section 90 that faces connector plate 74 via through opening 98. Therefore, seal 76 essentially divides chamber 72 into an upper portion 134 and a lower portion 136. Given this configuration, the surface area of seal 76 that is in direct facing relationship to connector plate 74 is greater than the surface area of seal 76 that is in direct facing relationship with upper body section 44 when seal 76 is seated on projection 82. Accordingly, the pressurized gas contained within reservoir 42 exerts a greater closing force than opening force on seal 76.

Figure 8:
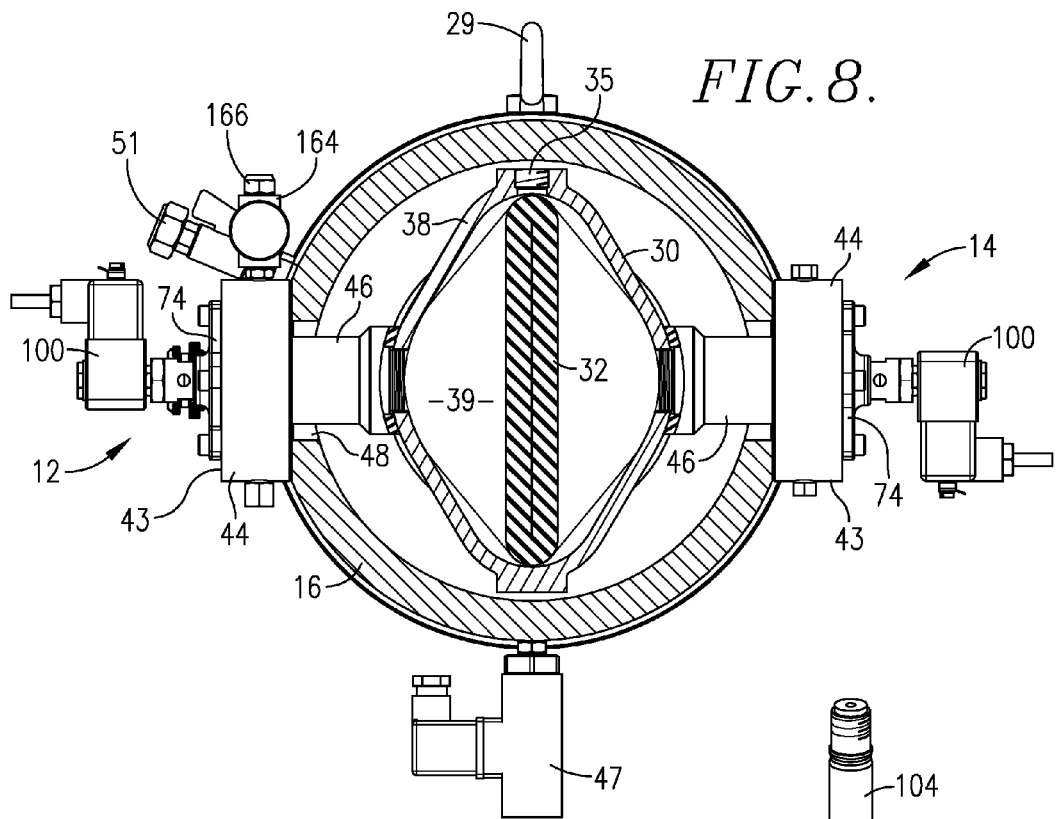
FIG. 8 is a cross-sectional view of the isolation valve similar to FIG. 4, but with the internal sleeve shown in the "pinched" or valve closed configuration.

When desired to operate valve 10 by causing sleeve 32 to collapse and shift to the closed configuration, as shown in FIG. 8, solenoid 100 is actuated so as to cause plug 102 to shift and expose passage 110. Pressurized gas supplied by reservoir 42 and contained within a seat chamber 138 defined by seat 108 and membrane 116 is permitted to escape. Due to the relatively small size of orifice 120, the pressure within seat chamber 138 cannot quickly equalize with the pressure in bore 130. Thus, as shown in FIG. 7, the force of the pressurized gas within bore 130 causes membrane 116 to flex into seat chamber 138 and thereby become unseated from rib 124. Pressurized gas from within bores 130, 132 and upper portion 134 may escape into annular recess 126 and through port 128.

The evacuation of pressurized gas from the actuator assemblies 12, 14 causes a shift in the forces acting upon seal 76. The force of the pressurized gas acting upon the surface of seal 76 in lower portion 136 of chamber 72 is now greater than the force of the pressurized gas acting upon the surface of seal 76 which resides in upper portion 134. Accordingly, seal 76 becomes unseated from projection 82 and a pathway fluidly coupling reservoir 42 and bore 78 is established. Particularly, the pathway for the flow of pressurized gas from reservoir 42 to bore 78, and ultimately to gas-receiving chamber 39 is as follows: reservoir 42, through the annulus defined by outer wall opening 48 and lower body section 46, through passages 70, through chamber 72, and into bore 78. Pressurized gas enters bore 78 and impinges upon sleeve 32 thereby causing sleeve 32 to collapse into relief zone 40 and shift valve 10 to the closed position cutting off communication between pipe sections 26, 28.

Figure 13:
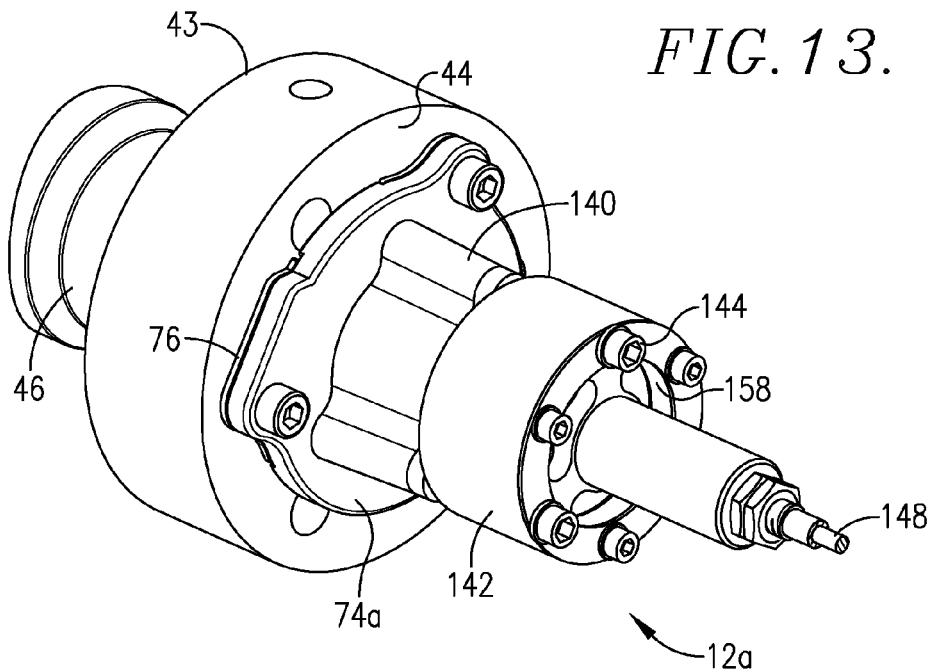
FIG. 13 is a perspective view of an alternate embodiment of an actuator assembly that may be used with the present invention.
Figure 14:
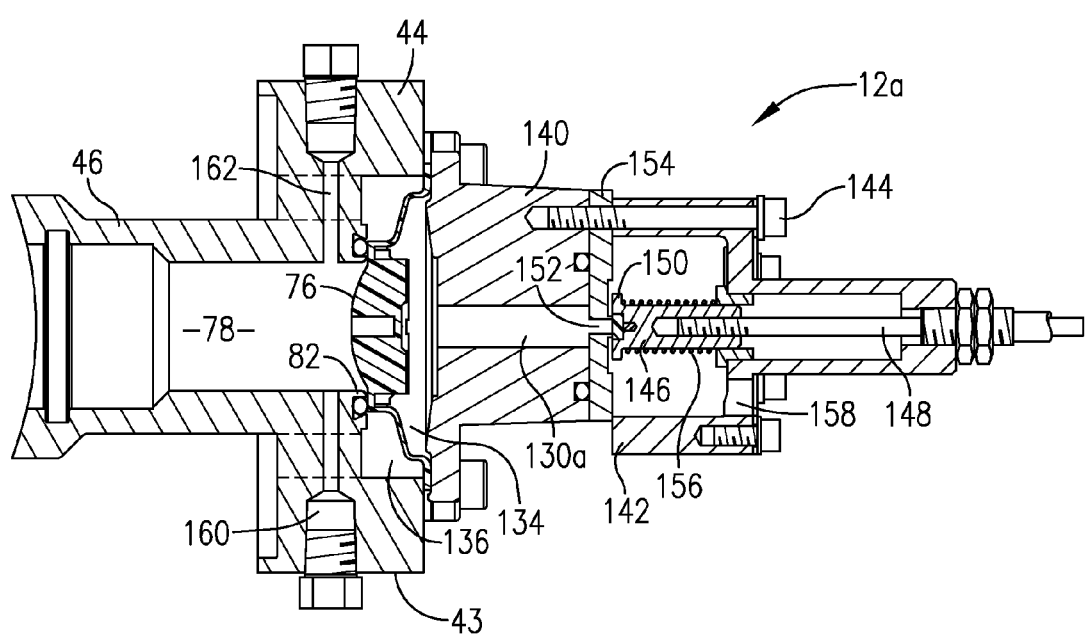
FIG. 14 is a cross-sectional view of the actuator assembly of FIG. 13 installed on the isolation valve.

Other types of actuator assemblies can be used to initiate a flow of pressurized gas stored in reservoir 42 and cause valve 10 to shift from the valve open position to the valve closed position, and thus the foregoing description should not be seen as limiting the scope of the invention in any way. One alternate actuation scheme is depicted in FIGS. 13 and 14. In this embodiment, a mechanically triggered actuator assembly 12a is provided in place of the solenoid actuated assembly 12. Actuator assembly 12 comprises an actuator body 43 and seal 76 as previously described. Connector plate 74a comprises a projecting collar 140 to which a mechanical actuator 142 is secured by bolts 144. Actuator 142 comprises a shiftable plug 146 coupled to an actuator cable 148, that interconnects actuator assembly 12a with some kind of mechanical device (not shown), the operation of which will initiate closure of valve 10. In certain embodiments, this mechanical device can be a rupturable device such as an explosion vent or rupture disc. However, any device capable of moving cable 148 may be used. Plug 146 includes an enlarged head 150 that normally seals an orifice 152 formed in a plate 154 secured between actuator 142 and collar 140.

In the non-actuated configuration of actuator assembly 12a, a spring 156 is used to bias plug 146 toward plate 154 so that head 150 is seated thereon and seals orifice 152 to prevent escape of pressurized gas from bore 130a. Upon actuation of the mechanical device that is coupled to cable 148, cable 148 and plug 146 are retracted against the bias of spring 156. This unseals opening 152 permitting pressurized gas located in enclosed area upper portion 134 and bore 130a to escape through ports 158 thereby permitting the pressurized gas located in enclosed area lower portion 136 to effect shifting of seal 46 from its seated position on projection 82. Accordingly, pressurized gas from reservoir 42 is permitted to enter bore 78 and chamber 39 and effect collapse of sleeve 32 to close valve 10.

Upper body section 44 also includes a plurality of ports 160 formed therein that communicate with bore 78 through passages 162. Although illustrated as plugged in FIGS. 5 and 6, ports 160 may be fitted with a manually operated valve 164 (see, FIG. 1) fitted with a pair of exhaust filters 166 so as to permit depressurization of bore 78 and gas-receiving chamber 39 and reopening of valve 10 subsequent to valve actuation.

We claim:
1. An isolation valve comprising:
a valve body outer wall and a valve body inner wall, said outer and inner walls cooperating to define at least in part a pressurized gas reservoir;
a flexible sleeve disposed within said inner wall, said sleeve and said inner wall cooperating to define at least in part a gas-receiving chamber; and
at least one actuator assembly configured upon actuation to cause a gas stored in said reservoir to flow into said chamber and effect closure of said valve,
said actuator assembly being configured to block communication between said pressurized gas reservoir and said gas-receiving chamber when in a valve open configuration and to permit communication between said pressurized gas reservoir and said gas-receiving chamber when in a valve closed configuration.
2. The isolation valve according to claim 1, wherein said valve body outer wall is substantially cylindrical.
3. The isolation valve according to claim 1, wherein said valve body inner wall is coaxial with said valve body outer wall.
4. The isolation valve according to claim 3, wherein said valve body inner wall has a bulged central segment and substantially cylindrical end sections.
5. The isolation valve according to claim 1, wherein said valve further comprises at least one conduit segment extending between said valve body outer wall and said valve body inner wall.
6. The isolation valve according to claim 5, wherein said at least one conduit section is coupled with said at least one actuator assembly thereby defining, at least in part, a passageway between said pressurized gas reservoir and said gas-receiving chamber.

7. The isolation valve according to claim 6, wherein said actuator assembly comprises a displaceable seal, said seal configured to block said passageway when said valve is in said valve open configuration.

8. The isolation valve according to claim 7, wherein upon actuation of said actuator assembly said seal is displaced to unblock said passageway and cause said valve to close.

9. The isolation valve according to claim 7, wherein said seal is configured to be maintained in blocking relationship to said passageway at least in part by a force exerted on said seal by pressurized gas stored within said pressurized gas reservoir.

10. The isolation valve according to claim 1, wherein said actuator assembly comprises a solenoid.

11. An isolation valve comprising:
a tubular outer wall;
a tubular inner wall disposed at least in part within said tubular outer wall;
a flexible sleeve disposed at least in part within said inner wall and shiftable between a valve open configuration and a valve closed configuration,
said inner and outer walls cooperating to define at least in part a pressurized gas reservoir,
said inner wall and said flexible sleeve cooperating to define, at least in part, a gas-receiving chamber,
said pressurized gas reservoir and said gas-receiving chamber being interconnected by at least one passageway; and
at least one actuator assembly configured to block communication between said pressurized gas reservoir and said gas-receiving chamber through said passageway while said valve is in said valve open configuration, and shiftable upon actuation to unblock said passageway thereby pen lifting flow of pressurized gas from said reservoir to said chamber and causing said valve to shift to said valve closed configuration.

12. The isolation valve according to claim 11, wherein said outer wall is substantially cylindrical.

13. The isolation valve according to claim 11, wherein said outer wall, inner wall and sleeve are coaxial.

14. The isolation valve according to claim 11, wherein said inner wall has a bulged central segment and substantially cylindrical end sections.

15. The isolation valve according to claim 11, wherein said valve further comprising at least one conduit segment coupled with said at least one actuator assembly and extending between said outer wall and said inner wall, said at least one conduit segment forming a part of said passageway.

16. The isolation valve according to claim 11, wherein said actuator assembly comprises a displaceable seal, said seal configured to block said passageway when said valve is in a valve open configuration.

17. The isolation valve according to claim 16, wherein upon actuation of said actuator assembly said seal is displaced to unblock said passageway and cause said valve to shift to said valve closed configuration.

18. The isolation valve according to claim 17, wherein said seal is configured to be maintained in blocking relationship to said passageway at least in part by a force exerted on said seal by pressurized gas stored within said pressurized gas reservoir.

19. The isolation valve according to claim 11, wherein said actuator assembly comprises a solenoid.

20. An isolation valve comprising:
a valve body outer wall and a valve body inner wall, said outer and inner walls cooperating to define at least in part a pressurized gas reservoir;
a flexible sleeve disposed within said inner wall, said sleeve and said inner wall cooperating to define at least in part a gas-receiving chamber; and
at least one actuator assembly configured upon actuation to cause a gas stored in said reservoir to flow into said chamber and effect closure of said valve,
wherein said valve further comprises at least one conduit segment extending between said valve body outer wall and said valve body inner wall, said at least one conduit section being coupled with said at least one actuator assembly thereby defining, at least in part, a passageway between said pressurized gas reservoir and said gas-receiving chamber.

* * * * *